US012761138B2

(12) United States Patent
Sasayama et al.

(10) Patent No.: US 12,761,138 B2
(45) Date of Patent: Oct. 13, 2026

(54) GAS SENSOR AND OPTICAL DEVICE

(71) Applicant: Asahi Kasei Microdevices Corporation, Tokyo (JP)

(72) Inventors: Kengo Sasayama, Tokyo (JP); Kenta Furuta, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 227 days.

(21) Appl. No.: 18/603,205

(22) Filed: Mar. 13, 2024

(65) Prior Publication Data

US 2024/0319076 A1 Sep. 26, 2024

(30) Foreign Application Priority Data

Mar. 24, 2023 (JP) ................................ 2023-049039
Jan. 5, 2024 (JP) ................................ 2024-000818

(51) Int. Cl.
*G01N 21/17* (2006.01)
*G01N 21/3504* (2014.01)

(52) U.S. Cl.
CPC ..... *G01N 21/1702* (2013.01); *G01N 21/3504* (2013.01); *G01N 2021/1704* (2013.01); *G01N 2201/062* (2013.01); *G01N 2201/0636* (2013.01)

(58) Field of Classification Search
CPC ............... G01N 21/1702; G01N 21/35; G01N 21/3504; G01N 2021/1704; G01N 2201/062; G01N 2201/0636
See application file for complete search history.

(56) References Cited

U.S. PATENT DOCUMENTS

2011/0090505 A1 4/2011 Kuze et al.
2011/0296900 A1 12/2011 Thorson
2016/0313288 A1 10/2016 Theuss et al.
2019/0376889 A1 12/2019 Takei et al.
2020/0072739 A1 * 3/2020 Sasayama .............. G01N 21/93

FOREIGN PATENT DOCUMENTS

JP 2008153617 A 7/2008
JP 2011252906 A 12/2011
JP 2015152438 A 8/2015
JP 2018101722 A 6/2018
WO 2009148134 A1 12/2009
WO 2018097071 A1 5/2018
WO 2020212481 A1 10/2020

* cited by examiner

*Primary Examiner* — Benjamin R Schmitt
(74) *Attorney, Agent, or Firm* — KENJA IP LAW PC

(57) ABSTRACT

Provided are a miniaturized gas sensor and optical device enabling accurate measurement. A gas sensor (10) includes a light emitter (11) emitting light as infrared light, a detector (12) detecting a signal based on light from the light emitter, a light guide (17) at least including a mirror and reflects the light to form an optical path in which the light from the light emitter passes through an introduced gas and an optical filter (16) disposed in an optical path to limit a transmission wavelength band of the light, in which a base material of the optical filter has a refractive index of 1.5 or more in the transmission wavelength band and the optical filter satisfies 0.3<(T/Lf)<1.3 where T [mm] is a thickness of the optical filter and Lf [mm] is a maximum length of the optical filter in a longitudinal direction in a planar view.

14 Claims, 10 Drawing Sheets

GAS SENSOR AND OPTICAL DEVICE

CROSS-REFERENCE TO RELATED APPLICATIONS

This application claims the priority of Japanese Patent Application No. 2023-049039 (filed on Mar. 24, 2023) and Japanese Patent Application No. 2024-000818 (filed on Jan. 5, 2024), which are incorporated herein by reference in their entirety.

TECHNICAL FIELD

This disclosure relates to a gas sensor and an optical device.

BACKGROUND

Recent years have seen development of gas sensors (gas measurement apparatuses) including a light emitter that emits infrared light, configured in such a way that infrared light passes through a gas including a gas to be detected, and utilizing the infrared light absorption characteristics of a gas to be detected to detect a concentration of a gas to be detected. The gas to be detected is, for example, alcohols or carbon dioxide. The gas sensor is, for example, one which uses the non-dispersive infrared light absorption (NDIR: Non-Dispersive InfraRed) method and includes a light receiver that receives infrared light passing through a gas. For example, PTL 1 discloses a photoacoustic gas sensor that determines the concentration of a gas by using a microphone with enhanced performance to pick up vibrations of a gas molecule absorbing light as sounds. For example, PTL 1 discloses that the bas sensor disclosed in PTL 1 can have a size of 1× 1×0.7 $cm^3$.

CITATION LIST

Patent Literature

PTL 1: WO2020/212481

SUMMARY

There has been a need for further miniaturization of gas sensors. In the gas sensor that utilizes the infrared light absorption characteristics of a gas to be detected, an optical filter that limits or selects the wavelength of infrared light is used. In many cases, sufficient optical performance cannot be achieved by simply miniaturizing an optical filter. In order to achieve a gas sensor that is miniaturized and enables accurate measurement, it is necessary to cause light to reach an appropriate place.

It could therefore be helpful to provide a gas sensor and an optical device that are miniaturized and enable accurate measurement.

(1) A gas sensor according to one of the disclosed embodiments includes a light emitter that emits light as infrared light;

a detector that detects a signal based on light emitted from the light emitter, a light guide that at least includes a mirror and reflects the light to form an optical path in which the light emitted from the light emitter passes through an introduced gas, and an optical filter that is disposed in the optical path to limit a transmission wavelength band of the light, in which a base material of the optical filter has a refractive index of 1.5 or more in the transmission wavelength band, and the optical filter satisfies $0.3<(T/Lf)<1.3$ where T [mm] is a thickness of the optical filter and Lf [mm] is a maximum length of the optical filter in a longitudinal direction in a planar view.

(2) A gas sensor according to one of the disclosed embodiments includes a light emitter that emits light as infrared light, a detector that detects a signal based on light emitted from the light emitter, a light guide that at least includes a mirror and reflects the light to form an optical path in which the light emitted from the light emitter passes through an introduced gas, and an optical filter that is disposed in the optical path to limit a transmission wavelength band of the light, in which a base material of the optical filter has a refractive index of 1.5 or more in the transmission wavelength band, a ratio of an area of the optical filter in a planar view to an area of the light emitter is in a range of 1 to 1.2, and the optical filter satisfies $0.25<(T/Lf)\leq 0.3$ where T [mm] is a thickness of the optical filter and Lf [mm] is a maximum length of the optical filter in a longitudinal direction in the planar view.

(3) As one of the disclosed embodiments, in the item (1) or (2), the light emitter is an LED.

(4) As one of the disclosed embodiments, in any one of the items (1) to (3), the detector is a microphone and, by using a photoacoustic method, determines the presence or a concentration of a gas to be detected.

(5) As one of the disclosed embodiments, in any one of the items (1) to (4), an area of a surface of the optical filter on a side opposite to a light source is larger than an area of a surface of the optical filter on a side of the light source.

(6) As one of the disclosed embodiments, in any one of the items (1) to (4), the optical filter has a maximum length in a longitudinal direction at an intermediate portion between a surface on a side of a light source and a surface on a side opposite to the light source.

(7) As one of the disclosed embodiments, in any one of the items (1) to (6), the refractive index is 3.2 or more.

(8) As one of the disclosed embodiments, in any one of the items (1) to (7), the optical filter is positioned to satisfy $0.9\leq(Lf\times(\sqrt{d}))\leq 2.5$ where d [mm] is the shortest distance between a surface on a side opposite to a light source and the mirror of the light guide which the light first reaches.

(9) As one of the disclosed embodiments, in any one of the items (1) to (8), the optical filter is positioned in such a way that a distance between a surface on a side of a light source and the light emitter is 10 μm or more and is less than or equal to ½ of Lf [mm].

(10) As one of the disclosed embodiments, in the item (9), the optical filter is positioned in such a way that the distance between the surface on the side of the light source and the light emitter is 10 μm or more and less than or equal to 1/10 of Lf [mm].

(11) As one of the disclosed embodiments, in the item (8), the d is less than or equal to 6 times the Lf.

(12) As one of the disclosed embodiments, in the item (1), a ratio of an area of the optical filter in the planar view to an area of the light emitter is in a range of 1 to 1.2.

(13) As one of the disclosed embodiments, in any one of the items (1) to (12), a portion of a side surface of the optical filter is exposed and other portions of the side surface are covered.

(14) As one of the disclosed embodiments, in any one of the items (1) to (12), an edge of the optical filter is not provided with a screen and the entire surface of the optical filter is exposed.

(15) An optical device according to one of the disclosed embodiments includes a light emitter that emits light as infrared light, and an optical filter that is disposed in an optical path to limit a transmission wavelength band of the light, in which a base material of the optical filter has a refractive index of 1.5 or more in the transmission wavelength band, and the optical filter satisfies $0.3<(T/Lf)<1.3$ where T [mm] is a thickness of the optical filter and Lf [mm] is a maximum length of the optical filter in a longitudinal direction in a planar view.

(16) An optical device according to one of the disclosed embodiments includes a light emitter that emits light as infrared light, and an optical filter that is disposed in an optical path to limit a transmission wavelength band of the light, in which a base material of the optical filter has a refractive index of 1.5 or more in the transmission wavelength band, a ratio of an area of the optical filter in a planar view to an area of the light emitter is in a range of 1 to 1.2, and the optical filter satisfies $0.25<(T/Lf)\leq 0.3$ where T [mm] is a thickness of the optical filter and Lf [mm] is a maximum length of the optical filter in a longitudinal direction in the planar view.

We can provide a gas sensor and an optical device that are miniaturized and enables accurate measurement.

DETAILED DESCRIPTION

A gas sensor according to one of the disclosed embodiments will be described below with reference to the drawings. Throughout the drawings, the same or equivalent portions are provided with the same reference sings. In the description of this embodiment, the description regarding the same or equivalent portions will be omitted or simplified as appropriate.

(Gas Sensor)

Figure 1:
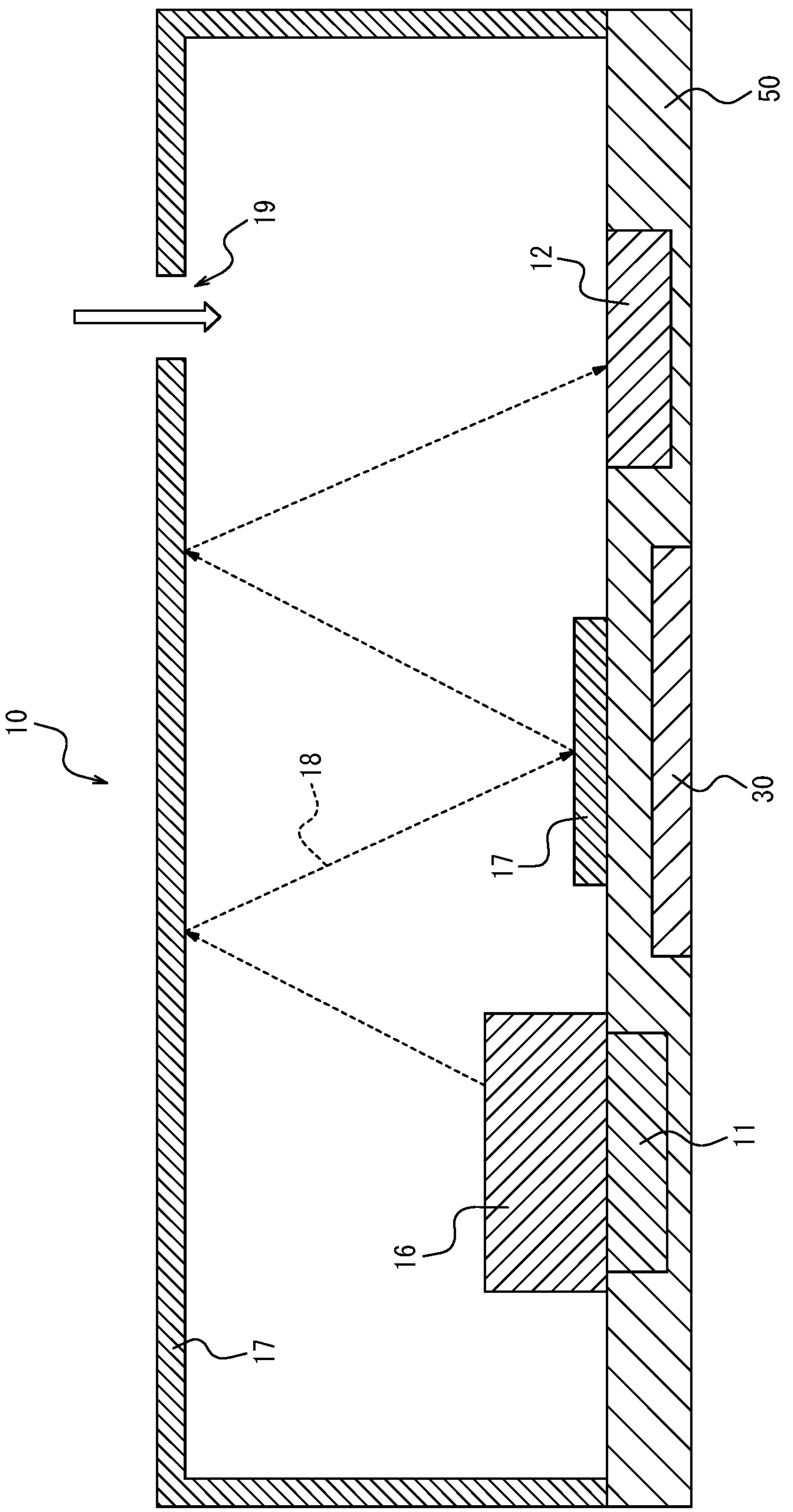
FIG. 1 illustrates an example of the configuration of a gas sensor according to one of the disclosed embodiments.

FIG. 1 illustrates the configuration of a gas sensor 10 according to this embodiment. The gas sensor 10 includes a light emitter 11, a detector 12, a light guide 17 and an optical filter 16. The gas sensor 10 can include an operation unit 30. FIG. 1 is a cross-sectional view of illustrating the cross-section of the gas sensor 10 including the above-mentioned components. Hereinafter, the way of looking at the cross-section of the gas sensor 10 as illustrated in FIG. 1 is referred to as cross-section view. The gas sensor 10 can be provided with a cover in such a way that a space for introduction of a gas is formed in the gas sensor 10. The gas sensor 10 according to this embodiment determines the presence or concentration of a gas to be measured (a gas to be detected) in the introduced gas (for example, the surrounding air). The gases to be detected can be, for example, carbon dioxide, water vapor, carbon monoxide, nitric monoxide, ammonia, sulfur dioxide, alcohol, formaldehyde, methane, propane, and other flammable gases. As one of the components of the gas sensor 10, the gas sensor 10 can employ an optical device composed of the light emitter 11 and the optical filter 16. In other words, the light emitter 11 and the optical filter 16 can constitute an integrated device.

(Detector) In the gas sensor 10 according to this embodiment, the detector 12 is a microphone and, by using a photoacoustic method, determines the presence or concentration of a gas to be detected. The photoacoustic method determines the presence or concentration of a gas to be detected by using a microphone with enhanced performance to pick up vibrations of a gas molecule absorbing light 18 as sounds (change in pressure). The detector 12 detects a signal based on the light 18 emitted from the light emitter 11. In the photoacoustic method, the vibration sounds of a gas molecule absorbing the light 18 corresponds to a signal based on the light 18.

The gas sensor 10 is not limited to an apparatus that employs a photoacoustic method. As another example of the gas sensor 10, the detector 12 is a light receiving device and can determine the presence or concentration of a gas to be detected by the NDIR method. By utilizing the matter that the wavelengths of infrared light absorbed by gases varies according to the type of the gas, the NDIR method determines the presence or concentration of a gas to be detected by detecting the amount of the infrared light absorbed. The detector 12 detects a signal based on the light 18 emitted from the light emitter 11 and, in the NDIR method, the infrared light absorbed by a gas to be detected corresponds to a signal based on the light 18. In the NDIR method, the detector 12 can be a quantum sensor such as a photodiode having PIN structure.

(Light Emitter)

The light emitter 11 emits light 18 including wavelengths that are absorbed by gases to be detected. As a specific example, the light emitter 11 can be an LED (light emitting diode), a lump or a MEMS (micro electro mechanical systems) light source. In this embodiment, the light emitter 11 is an LED (infrared LED) that emits light 18 as infrared light.

The wavelength of infrared light can be 2 μm to 12 μm. The region of 2 μm to 12 μm is a wavelength band particularly suitable for use in the gas sensor 10 because many absorption bands specific to different gases exists in this region. For example, the absorption bands of methane, carbon dioxide, and an alcohol (ethanol) are at wavelengths of 3.3 μm, 4.3 μm, and 9.5 μm, respectively.

As described above, in this embodiment, the light emitter 11 is an infrared LED. The light emitter 11 can have a diode structure including, as its materials, at least one of indium and gallium and at least one of arsenic and antimony, and consisting of at least two layers made of a P-type semiconductor and an N-type semiconductor. In the NDIR method, the detector 12 can be a quantum infrared sensor. In this case, the detector 12 can have a diode structure similar to that of the light emitter 11.

(Light Guide)

The light guide 17 is an optical system of the gas sensor 10 and includes optical components. The light guide 17 guides the light 18 in such a way that the light 18 emitted from the light emitter 11 forms a desired optical path. Examples of the optical components include a mirror and a lens. In this embodiment, the light guide 17 at least includes a mirror and reflects the light 18 to form an optical path in which the light 18 emitted from the light emitter 11 passes through an introduced gas. In the example illustrated in FIG. 1, the light guide 17 includes a plurality of plane mirrors but the light guide 17 may not include a plurality of plane mirrors. For example, the light guide 17 can include a concave mirror. The reflection surface of the light guide 17 can be made of a metal with high reflectivity such as aluminum and gold. As in the example illustrated in FIG. 1, inner surfaces of the cover forming a space for introduction of a gas can be mirrors of the light guide 17, except for a hole 19 for introduction of a gas from the outside. In this case, the mirror can be formed by vapor deposition or plating on the cover as a resin housing. In comparison to the case where the entirety of the cover is made of metal material, higher productivity and lighter weight can be achieved. As in the example illustrated in FIG. 1, another light guide 17 (another mirror) can be provided to oppose an inner surface the cover across the space for introduction of a gas. When the light 18 emitted from the light emitter 11 first reaches the mirror, the amount of light that reaches a mirror is referred to as the amount of light reached (See FIGS. 3 to 11).

(Optical Filter)

The optical filter 16 is disposed in an optical path to limit the transmission wavelength band of the light 18. In other words, the optical filter 16 allows for selective transmission of infrared light that falls within an absorption band specific to a gas to be detected. As a result, the measurement accuracy of the gas sensor 10 can be improved. When the gas to be detected is, for example, $CO_2$, the optical filter 16 can be a bandpass filter that passes infrared light in a wavelength band where absorption of infrared light by $CO_2$ tends to occur (typically around 4.3 μm).

The optical filter 16 is required to be disposed on an optical path. In this embodiment, the optical filter 16 is disposed to be in contact with the light emitter 11 to cover a light emitting surface of the light emitter 11. The matter of the optical filter 16 being disposed to be in contact with the light emitter 11 includes not only the case where the optical filter 16 is disposed to be in contact directly with the light emitter 11 but also the case where a gap (space) is provided between the optical filter 16 and the light emitter 11. The matter of the optical filter 16 being disposed to be in contact with the light emitter 11 includes contact via a solder, an adhesive or a grease, for example. As illustrated in FIG. 1, the optical filter 16 is disposed on top of the light emitter 11. Hereinafter, the direction of disposing the optical filter 16 on top of the light emitter 11 is referred to as height direction.

(Operation Unit)

The operation unit 30 obtains a signal based on the light 18 detected by the detector 12 and performs operation for detecting the presence or a concentration of the gas to be detected. The operation unit 30 can control at least one of the light emitter 11 and the detector 12. The operation unit 30 can include at least one of a general purpose processor that performs a function according to a program to be read, and a special purpose processor specialized for a particular processing. The special purpose processor can include an application specific IC (ASIC: Application Specific Integrated Circuit).

(Molded Resin) In the gas sensor 10 according to this embodiment, the light emitter 11, the detector 12 and the operation unit 30 are packaged with optical components (the light guide 17 and the optical filter 16). In the example illustrated in FIG. 1, the light emitter 11, the detector 12 and the operation unit 30 are embedded and sealed in a molded resin 50. The molded resin 50 seals portions of the optical filter 16 and the light guide 17, and can serve as a fixing member that secures the optical filter 16 and the light guide 17. As a material of the molded resin 50, an epoxy or phenolic resin can be used, for example. A molded resin 50 can include a filler material such as $SiO_2$ and $Al_2O_3$.

As another example, the gas sensor 10 can be configured in such a way that the light emitter 11, the detector 12 and the operation unit 30 are not sealed by the molded resin 50, but instead, are mounted on a PCB (Printed Circuit Board). For example, the light emitter 11 and the detector 12 can be mounted on a front surface of a PCB, which is one of main surfaces of the PCB, and the light guide 17 and the optical filter 16 can be provided by adhesion. For example, the operation unit 30 can be mounted on the back surface of the PCB, which is the other of main surfaces of the PCB. The main surface is a surface having the largest area of surfaces of PCB.

(Shape of the Optical Filter)

In a gas sensor 10 that utilizes the infrared light absorption characteristics of a gas to be detected, it is necessary to use the optical filter 16 that limits or selects the wavelength of infrared light. In many cases, simple miniaturizing of the optical filter 16 does not lead to sufficient optical performance. In order to achieve a gas sensor 10 that is miniaturized and enables accurate measurement, it is necessary to cause light 18 to reach an appropriate place.

Figure 2A:
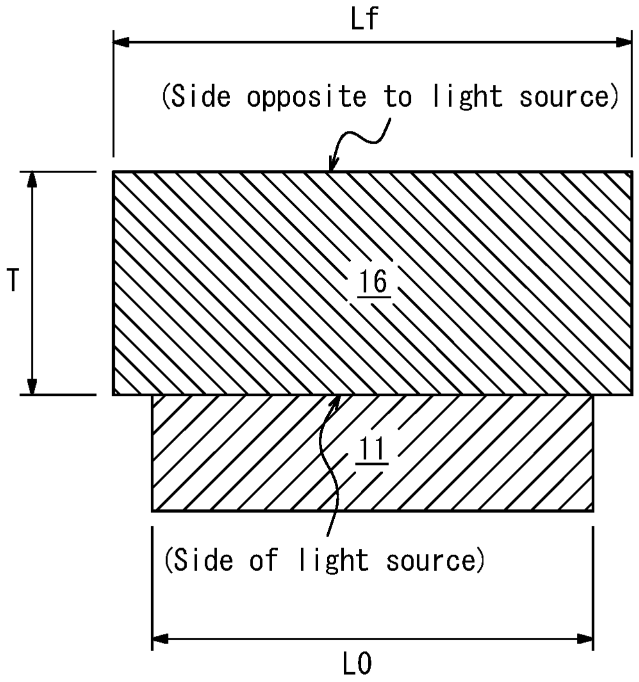
FIG. 2A illustrates the shape of the optical filter.
Figure 2B:
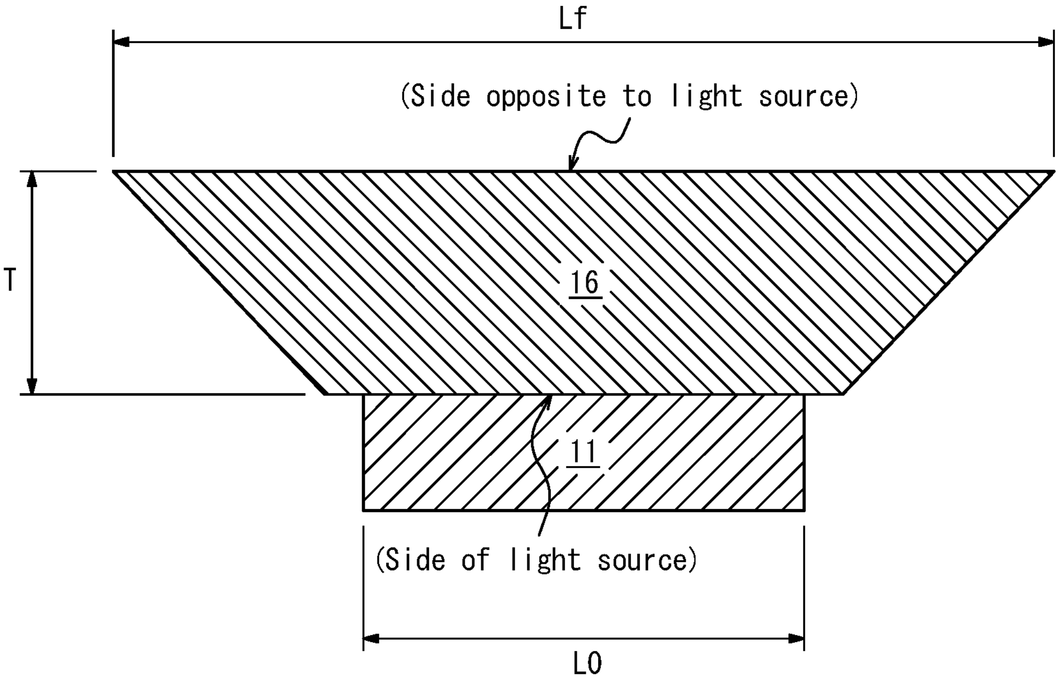
FIG. 2B illustrates the shape of the optical filter.
Figure 2C:
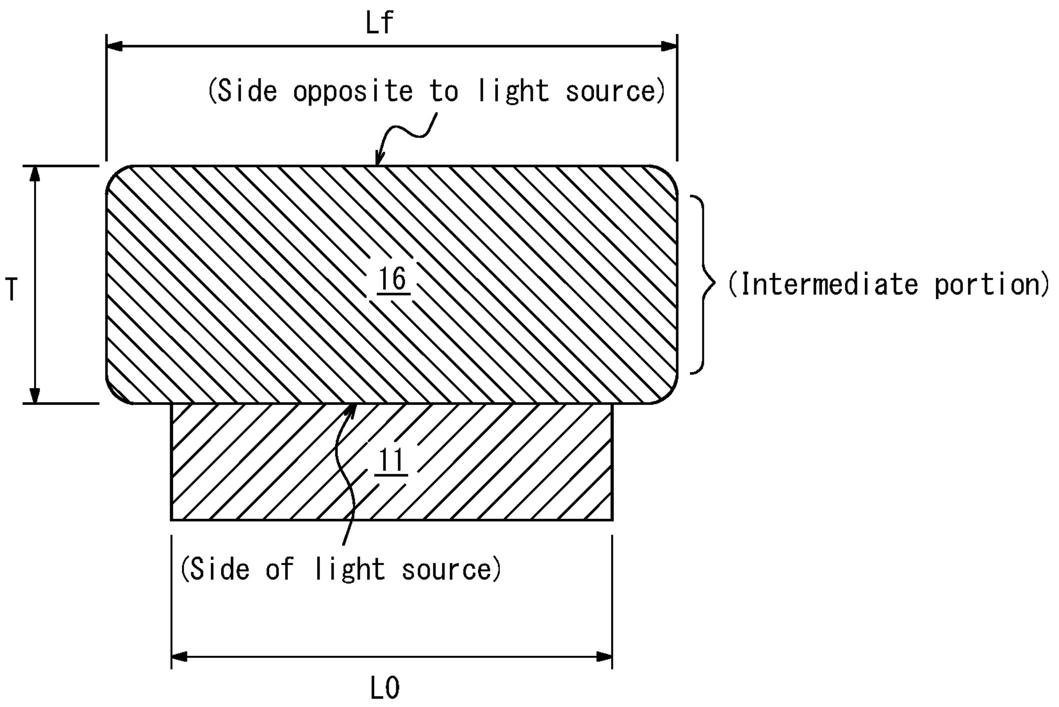
FIG. 2C illustrates the shape of the optical filter.

FIGS. 2A, 2B, and 2C illustrate the shapes of the optical filter 16. The refractive index of the base material of the optical filter 16 in the transmission wavelength band is high. For example, when the base materials of the optical filter 16 are glass, Si, and Ge, the refractive indices are about 1.5, 3.3 and 4.0, respectively. Therefore, the light 18 emitted from the light emitter 11 to the optical filter 16 is refracted and travel through the interior of the optical filter 16. Conventionally, light 18 with a deep incident angle does not reach a place where the light 18 is intended to reach (for example, the position of the mirror) and has not been able to be exploited. With some shapes of side surfaces of the optical filter 16, total reflection occurs to cause the light 18 to be trapped in the optical filter 16. Therefore, light with a deep incident angle that has not been exploited is able to reach an appropriate place. Therefore, the amount of light reached changes according to the relationship between the shape of the optical filter 16 (the thickness of the optical filter 16 and the maximum length of the optical filter 16 in a longitudinal direction), the length of the light emitter 11 in the longitudinal direction, and the refractive index of the optical filter 16. Conditions that allows for increase in the amount of light reached will be studied below. With regard to wavelength dispersion data of refractive indices in this embodiment, literature values were used. With regard to employment of measured values, values obtained by an ellipsometer according to JIS K7142 can be employed.

In FIGS. 2A to 2C, the light emitter 11 and the optical filter 16 are illustrated in a cross-section view analogous to as in FIG. 1. The light emitter 11 has a shape of cuboid. The optical filter 16 can has a shape of cuboid (FIG. 2A), frustum of square pyramid (FIG. 2B), or cuboid with rounded vertices (FIG. 2C). In other words, the optical filter 16 has a shape of quadrilateral, trapezoid or quadrilateral with rounded vertices in a cross-section view. T is the thickness of the optical filter 16 (the length in height direction). The planar view is defined as viewing the optical filter 16 from the front in such a manner that the height direction is taken as a line-of-sight direction. In this case, the optical filter 16 has a quadrilateral shape in a planar view. The quadrilateral can be square but is rectangular in this embodiment.

In FIGS. 2A to 2C, the direction orthogonal to the height direction corresponds to the longitudinal direction of the light emitter 11 and the optical filter 16. L0 is the length of the light emitter 11 in the longitudinal direction. Lf is the maximum length of the optical filter 16 in the longitudinal direction. The optical filter 16 illustrated in FIG. 2B has a shape with inclined side surfaces to facilitate total reflection further, and in a planar view, an area of a surface of the optical filter 16 on the side opposite to a light source is larger than an area of a surface of the optical filter 16 on the side of the light source. The length of the optical filter 16 illustrated in FIG. 2B on the side of the light source in the longitudinal direction is Lf. The surface on the side of the light source means a surface on the side near the light emitter 11 in a cross-section view. A surface on the side opposite to a light source means a surface on the side far from the light emitter 11 in a cross-section view. The optical filter 16 illustrated in FIG. 2C has rounded vertices (corners) to make the shape easier to manufacture. The length of the intermediate portion in the longitudinal direction is Lf. The intermediate portion means a portion, other than vertices, that extends from a surface on the side of a light source to a surface on the side opposite to the light source in a cross-section view. The optical filter 16 may not be quadrilateral (rectangle) in a planar view and can be circular, for example. When the optical filter 16 is rectangle, the maximum length of the optical filter 16 in the longitudinal direction is the length of the long side. When the optical filter 16 is circular, the maximum length of the optical filter 16 in the longitudinal direction is the diameter.

A portion of the side surface of the optical filter 16 can be exposed and other portions of the side surface can be covered. In a standpoint of holding the optical filter 16, the side surface is preferably covered with a holding member. In a standpoint of facilitation of occurrence of total reflection in the optical filter 16, the side surface is preferably exposed. Therefore, as a result of the matter that a portion of side surface of the optical filter 16 is exposed and other portions of the side surface of the optical filter 16 are not exposed (that is, covered with a holding member), holding properties and facilitation of occurrence of total reflection can be exerted in a balanced manner. When viewed from the side of the light source, an edge of the optical filter 16 may not be provided with a screen and the entire surface of the optical filter 16 can be exposed. The light 18 at the edges of the optical filter 16 can be effectively exploited by utilizing total reflection on the side surfaces of the optical filter 16.

Studies have made about the relationship between a combination of L0 (the length of the light emitter 11 in the longitudinal direction), Lf (the maximum length of the optical filter 16 in the longitudinal direction), and T (the thickness of the optical filter 16) as defined above, and the amount of light reached. Here, the refractive index of the base material of the optical filter 16 in the transmission wavelength band (hereinafter, referred to as "the refractive index of the optical filter 16") was set to be 1.5 or more and the simulations were performed with the refractive indices of 1.5, 3.3 and 4.0. The transmission wavelength band is 2 [μm] to 12 [μm].

To begin with, simulations of the relationship between Lf and L0 were performed. The software "Zemax OpticStudio", Zemax was used for the simulations. The following Tables 1 to 3 illustrate the values of the amount of light reached when Lf and L0 is changed in a range of 0.4 to 2.4 [mm]. In this regard, Lf cannot be less than L0. The amount of light reached is represented in arbitrary units and the same applies to FIGS. 3 to 11. In Tables 1 to 3, T is 530 [μm]. In Table 1, the refractive index of the optical filter 16 is 1.5. In Table 2, the refractive index of the optical filter 16 is 3.3. In Table 3, the refractive index of the optical filter 16 is 4.0.

TABLE 1

| | | L0 (mm) | | | | | | | | | | |
|---|---|---|---|---|---|---|---|---|---|---|---|---|
| | | 0.4 | 0.6 | 0.8 | 1.0 | 1.2 | 1.4 | 1.6 | 1.8 | 2.0 | 2.2 | 2.4 |
| Lf (mm) | 0.4 | 0.407 | — | — | — | — | — | — | — | — | — | — |
| | 0.6 | 0.425 | 0.408 | — | — | — | — | — | — | — | — | — |
| | 0.8 | 0.403 | 0.416 | 0.407 | — | — | — | — | — | — | — | — |
| | 1.0 | 0.369 | 0.394 | 0.411 | 0.406 | — | — | — | — | — | — | — |
| | 1.2 | 0.362 | 0.367 | 0.388 | 0.406 | 0.403 | — | — | — | — | — | — |
| | 1.4 | 0.362 | 0.361 | 0.365 | 0.383 | 0.401 | 0.400 | — | — | — | — | — |
| | 1.6 | 0.362 | 0.361 | 0.359 | 0.363 | 0.378 | 0.396 | 0.396 | — | — | — | — |
| | 1.8 | 0.362 | 0.360 | 0.359 | 0.357 | 0.360 | 0.373 | 0.391 | 0.392 | — | — | — |
| | 2.0 | 0.362 | 0.360 | 0.359 | 0.357 | 0.355 | 0.357 | 0.368 | 0.385 | 0.387 | — | — |
| | 2.2 | 0.362 | 0.360 | 0.359 | 0.357 | 0.354 | 0.352 | 0.354 | 0.363 | 0.380 | 0.382 | — |
| | 2.4 | 0.362 | 0.360 | 0.359 | 0.357 | 0.354 | 0.351 | 0.348 | 0.350 | 0.358 | 0.373 | 0.376 |

TABLE 2

| | | L0 (mm) | | | | | | | | | | |
|---|---|---|---|---|---|---|---|---|---|---|---|---|
| | | 0.4 | 0.6 | 0.8 | 1.0 | 1.2 | 1.4 | 1.6 | 1.8 | 2.0 | 2.2 | 2.4 |
| Lf | 0.4 | 0.258 | — | — | — | — | — | — | — | — | — | — |
| (mm) | 0.6 | 0.250 | 0.254 | — | — | — | — | — | — | — | — | — |
| | 0.8 | 0.238 | 0.247 | 0.251 | — | — | — | — | — | — | — | — |
| | 1.0 | 0.236 | 0.236 | 0.245 | 0.249 | — | — | — | — | — | — | — |
| | 1.2 | 0.235 | 0.235 | 0.235 | 0.243 | 0.246 | — | — | — | — | — | — |
| | 1.4 | 0.234 | 0.234 | 0.234 | 0.234 | 0.241 | 0.244 | — | — | — | — | — |
| | 1.6 | 0.234 | 0.234 | 0.233 | 0.232 | 0.232 | 0.238 | 0.241 | — | — | — | — |
| | 1.8 | 0.234 | 0.234 | 0.233 | 0.232 | 0.231 | 0.230 | 0.235 | 0.238 | — | — | — |
| | 2.0 | 0.234 | 0.234 | 0.233 | 0.231 | 0.230 | 0.229 | 0.227 | 0.232 | 0.235 | — | — |
| | 2.2 | 0.234 | 0.234 | 0.233 | 0.231 | 0.230 | 0.228 | 0.226 | 0.225 | 0.229 | 0.232 | — |
| | 2.4 | 0.234 | 0.234 | 0.233 | 0.231 | 0.230 | 0.228 | 0.226 | 0.224 | 0.222 | 0.226 | 0.228 |

TABLE 3

| | | L0 (mm) | | | | | | | | | | |
|---|---|---|---|---|---|---|---|---|---|---|---|---|
| | | 0.4 | 0.6 | 0.8 | 1.0 | 1.2 | 1.4 | 1.6 | 1.8 | 2.0 | 2.2 | 2.4 |
| Lf | 0.4 | 0.224 | — | — | — | — | — | — | — | — | — | — |
| (mm) | 0.6 | 0.212 | 0.219 | — | — | — | — | — | — | — | — | — |
| | 0.8 | 0.204 | 0.210 | 0.216 | — | — | — | — | — | — | — | — |
| | 1.0 | 0.202 | 0.202 | 0.208 | 0.213 | — | — | — | — | — | — | — |
| | 1.2 | 0.201 | 0.201 | 0.201 | 0.206 | 0.211 | — | — | — | — | — | — |
| | 1.4 | 0.200 | 0.200 | 0.200 | 0.200 | 0.204 | 0.208 | — | — | — | — | — |
| | 1.6 | 0.200 | 0.200 | 0.199 | 0.198 | 0.198 | 0.202 | 0.206 | — | — | — | — |
| | 1.8 | 0.200 | 0.200 | 0.199 | 0.198 | 0.197 | 0.197 | 0.200 | 0.203 | — | — | — |
| | 2.0 | 0.200 | 0.200 | 0.199 | 0.198 | 0.196 | 0.195 | 0.194 | 0.198 | 0.200 | — | — |
| | 2.2 | 0.200 | 0.200 | 0.199 | 0.198 | 0.196 | 0.195 | 0.193 | 0.192 | 0.195 | 0.197 | — |
| | 2.4 | 0.200 | 0.200 | 0.199 | 0.198 | 0.196 | 0.195 | 0.193 | 0.191 | 0.190 | 0.192 | 0.194 |

As is apparent from the results shown in Tables 1 to 3, the amount of light reached can be increased by bringing Lf closer to L0. In other words, a smaller Lf makes it easier for the light 18 emitted from the light emitter 11 to reach a side surface of the optical filter 16 directly. This may be because total reflection occurs on the side surfaces of the optical filter 16 and more light 18 travels through the interior of the optical filter 16 to a mirror of the light guide 17. Therefore, these simulations have revealed that miniaturization of the gas sensor 10 and improvement in the measurement accuracy of the gas sensor 10 can be achieved by miniaturizing the optical filter 16 to bring the maximum length (Lf) of the optical filter 16 in the longitudinal direction closer to the length (L0) of the light emitter 11 in the longitudinal direction.

Next, simulations of the shape (aspect ratio) of the optical filter 16 itself, that is, the relationship between T and Lf were performed. The software is as described above. FIGS. 3 to 11 illustrate the results of the simulations and the relationship between the ratio of T to Lf (T/Lf), which represents the shape of the optical filter 16, and the amount of light reached. The horizontal axis of FIGS. 3 to 11 represents a ratio obtained by dividing T [mm], which is the thickness of the optical filter 16, by Lf [mm], which is the maximum length of the optical filter 16 in the longitudinal direction. The vertical axis of FIGS. 3 to 11 represents the amount of light reached. In FIGS. 3 to 11, L0, which is the length of the light emitter 11 in the longitudinal direction, is changed in a range of 0.4 [mm] to 2.4 [mm], and changes in the amount of light reached according to the changes in L0 are illustrated.

Figure 3:
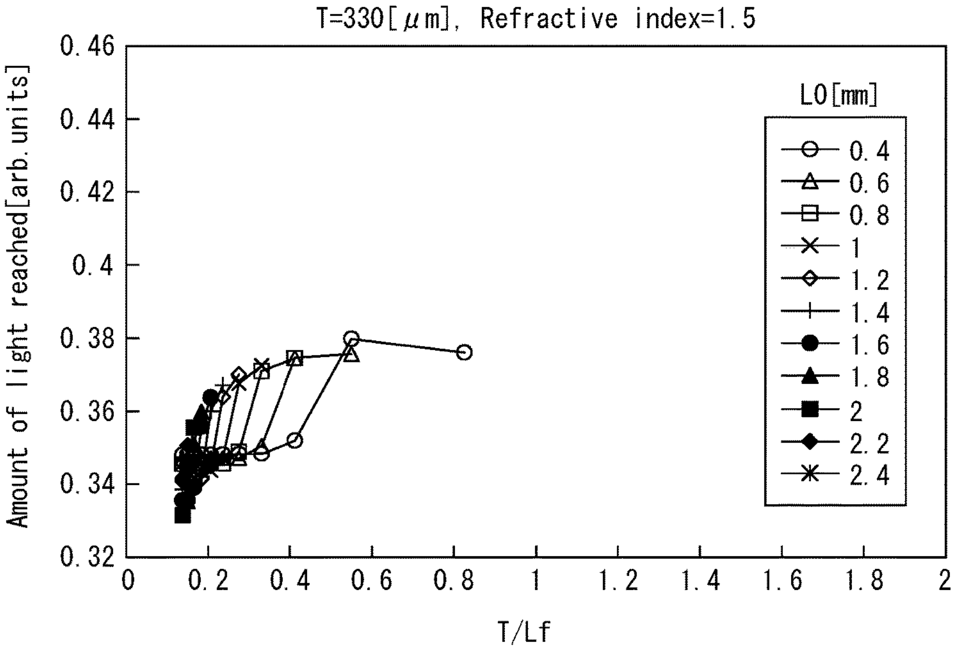
FIG. 3 illustrates an example of change in light amount in relation to change in the shape of the optical filter.
Figure 4:
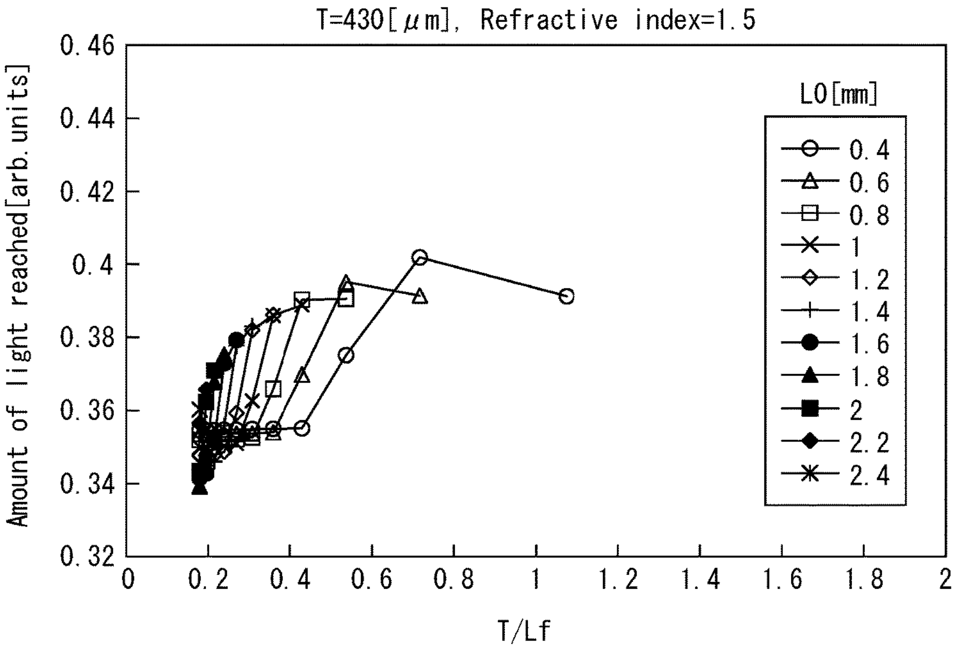
FIG. 4 illustrates an example of change in light amount in relation to change in the shape of the optical filter.
Figure 5:
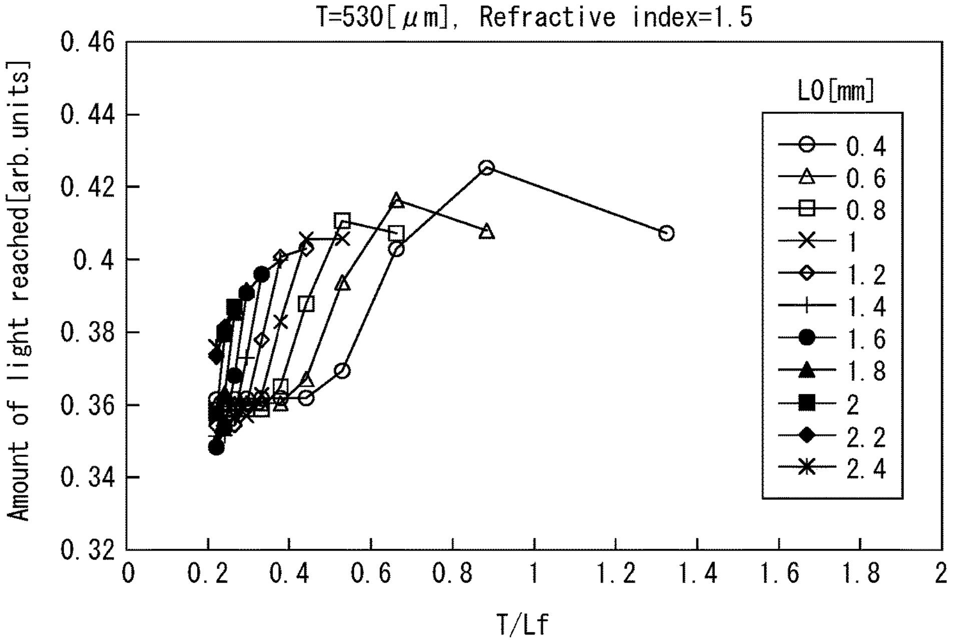
FIG. 5 illustrates an example of change in light amount in relation to change in the shape of the optical filter.

In FIGS. 3 to 5, the refractive index of the optical filter 16 is 1.5. In FIG. 3, T is 330 [μm]. In FIG. 4, T is 430 [μm]. In FIG. 5, T is 530 [μm]. In a range of $0.3<(T/Lf)<1.3$, the amount of light reached is sufficiently large regardless of the value of L0. In this regard, when (T/Lf) is 1.3 or more, the amount of light reached can be significantly decreased. Therefore, the optical filter 16 is preferably designed in such a way that the ratio of T to Lf (T/Lf) is less than the upper limit value of 1.3. When (T/Lf) is greater than 0.3, the amount of light reached is significantly increased. Therefore, the optical filter 16 is preferably designed in such a way that the ratio of T to Lf (T/Lf) is greater than the lower limit value of 0.3.

Figure 6:
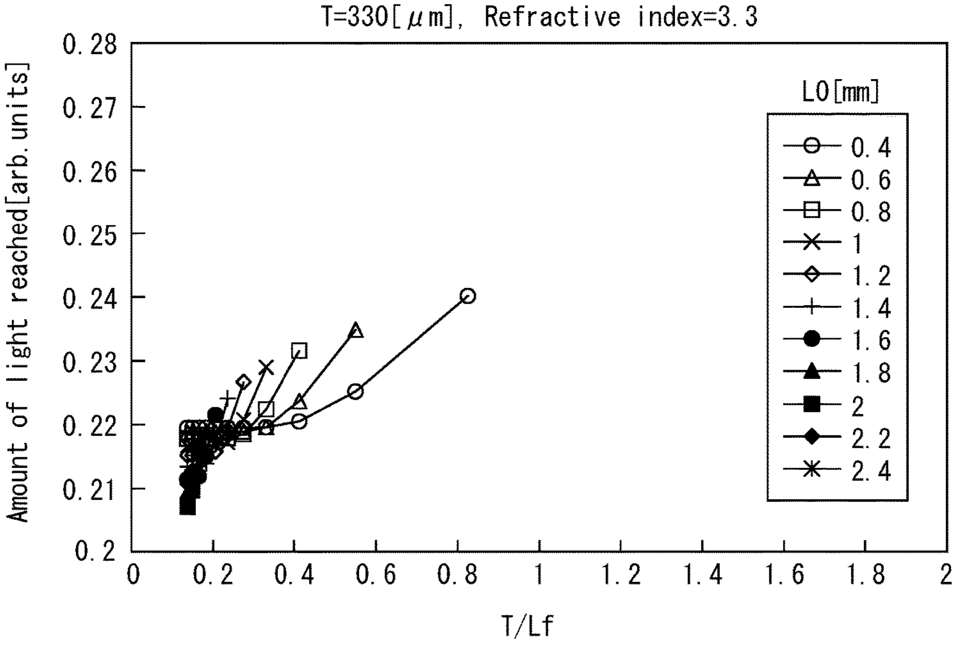
FIG. 6 illustrates an example of change in light amount in relation to change in the shape of the optical filter.
Figure 7:
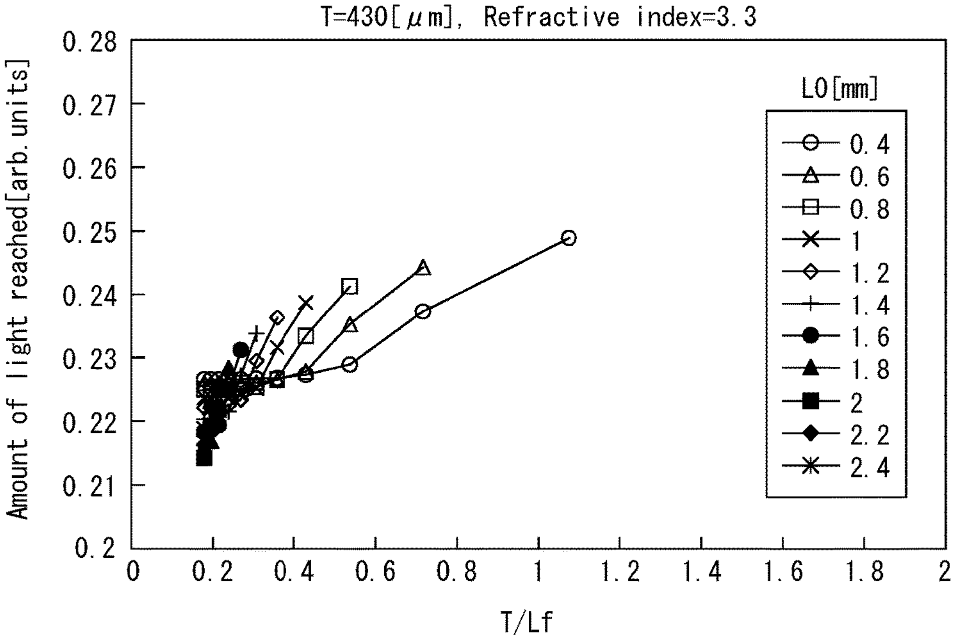
FIG. 7 illustrates an example of change in light amount in relation to change in the shape of the optical filter.
Figure 8:
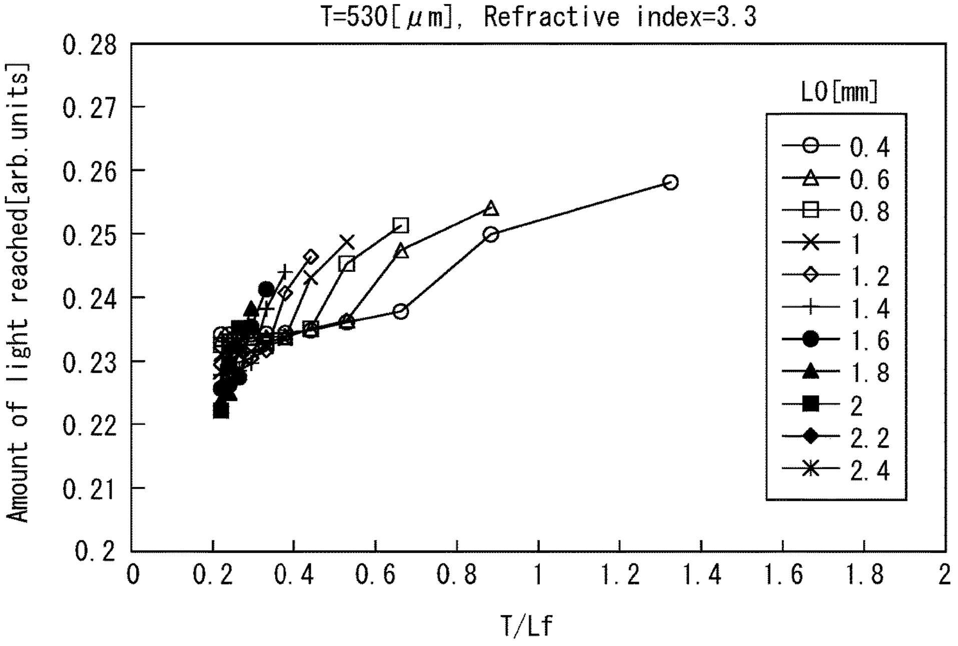
FIG. 8 illustrates an example of change in light amount in relation to change in the shape of the optical filter.
Figure 9:
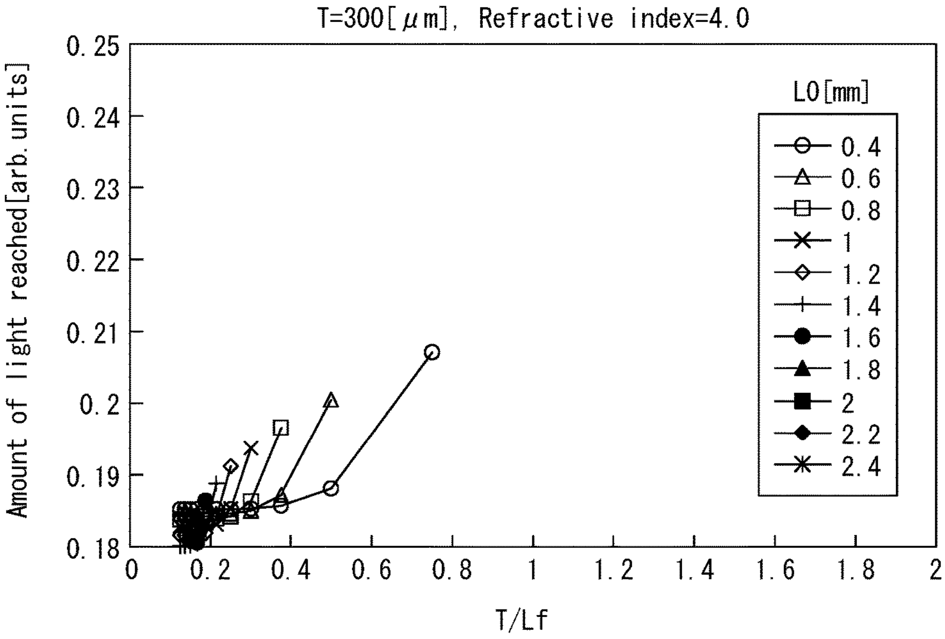
FIG. 9 illustrates an example of change in light amount in relation to change in the shape of the optical filter.
Figure 10:
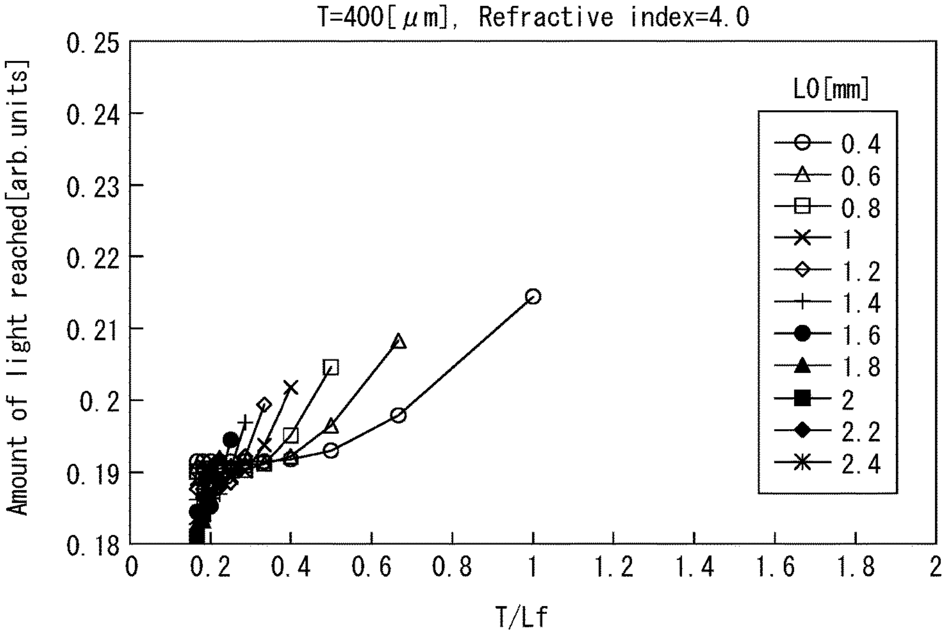
FIG. 10 illustrates an example of change in light amount in relation to change in the shape of the optical filter.
Figure 11:
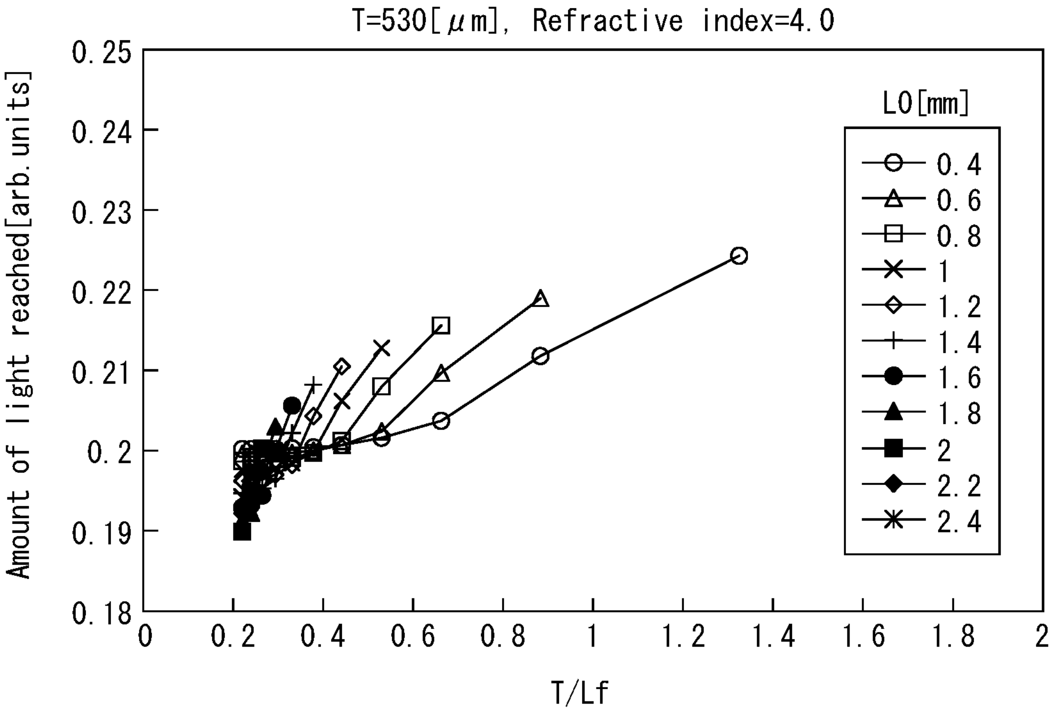
FIG. 11 illustrates an example of change in light amount in relation to change in the shape of the optical filter.

In FIGS. 6 to 8, the refractive index of the optical filter 16 is 3.3. In FIG. 6, T is 330 [μm]. In FIG. 7, T is 430 [μm]. In FIG. 8, T is 530 [μm]. In FIG. 9 to FIG. 11, the refractive index of the optical filter 16 is 4.0. In FIG. 9, T is 300 [μm]. In FIG. 10, T is 400 [μm]. In FIG. 11, T is 530 [μm]. In FIGS. 6 to 11, in a range of $0.3<(T/Lf)<1.3$, the amount of light reached is sufficiently large regardless of the value of L0. Therefore, the optical filter 16 is preferably designed to satisfy $0.3<(T/Lf)<1.3$. In addition, in FIGS. 6 to 11, there is no tendency for the amount of light reached to decrease. Therefore, the refractive index of the optical filter 16 is more preferably 3.2 or more.

The upper limit value of the ratio of T to Lf is not limited to 1.3. The lower limit value of the ratio of T to Lf is not limited to 0.3. For example, the optical filter 16 may be designed to satisfy $0.4<(T/Lf)<1.2$ by narrowing the above-described range. The optical filter 16 may be designed to satisfy $0.5<(T/Lf)<1.1$ by further narrowing the range.

For example, the upper limit value and the lower limit value can be changed according to other conditions. For example, if an area (Sf) of the optical filter 16 in a planar view is almost the same as an area (S0) of the light emitter 11, the condition of "bringing Lf closer to L0" is considered to be satisfied. In this case, the amount of light reached can be sufficiently increased as described above. For example, if a ratio of an area (Sf) of the optical filter 16 in a planar view to an area (S0) of the light emitter 11 is in a range of 1 to 1.2, that is, the condition of $1.0\leq(Sf/S0)\leq1.2$ is satisfied, the areas are considered to be approximately same. In this case, the range of the ratio of T to Lf can be further narrowed to satisfy, for example, 0.25<(T/Lf)≤0.3. Even if the range of the ratio of T to Lf is 0.3 or less, the condition of "bringing Lf closer to L0" is satisfied, and therefore, the amount of light reached is sufficiently large. In this case, the thickness (T) of the optical filter 16 can be reduced to achieve a further miniaturized (thinner) gas sensor 10.

Figure 12:
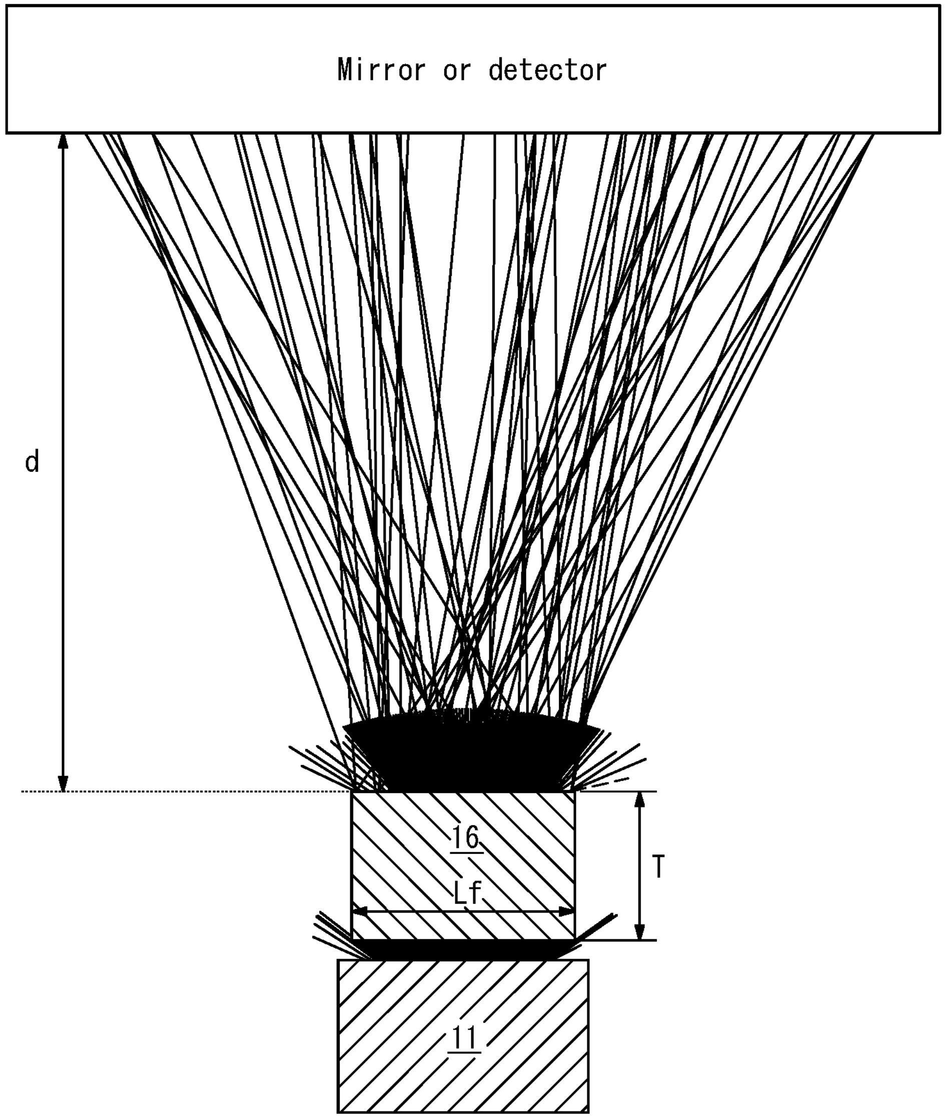
FIG. 12 illustrates an example of change in light amount in relation to distance between the optical filter and the light guide.

The amount of light reached changes according to the shortest distance between the exit plane for the light 18 of the optical filter 16 and the mirror of the light guide 17 which the light 18 first reaches. The exit plane for the light 18 of the optical filter 16 is a surface that is to be contact with a space when the light 18 emitted from the light emitter 11 passes through the optical filter 16 to the space, and also is a surface the side opposite to the light source. In the gas sensor 10, the optical filter 16 is preferably positioned to satisfy "0.9≤(Lf×(√d))≤2.5". d is the shortest distance [mm] between a surface on the side opposite to the light source of the optical filter 16 and the mirror of the light guide 17 which the light 18 first reaches. The lower limit value (0.9) is a value determined primarily by design constraints of miniaturization of the optical filter 16. The upper limit value can be 2.2 instead of 2.5. In other words, in the gas sensor 10, the optical filter 16 is more preferably positioned to satisfy "0.9≤(Lf×(√d))≤2.2". The effective range of the angle of the light 18 emitted from a surface of the optical filter 16 on the side opposite to the light source can be ±90° with a direction perpendicular to the exit plane being taken as 0°. In this range, the shortest distance between a surface of the optical filter 16 on the side opposite to the light source and the mirror of the light guide 17 can be taken as d. In the case where the effective exit angle of the light 18 is limited, the shortest distance, when viewed in a planar view, between the optical filter 16 and the mirror of the light guide 17 in the region where overlapping of the light 18 occurs can be taken as d (See FIG. 12). The detector 12 can be disposed instead of the mirror of the light guide 17.

Studies have made about the relationship between a combination of Lf (the maximum length of the optical filter 16 in the longitudinal direction) and d (the shortest distance between a surface of the optical filter 16 on the side opposite to the light source and the mirror of the light guide 17 which the light 18 first reaches) as defined above, and the amount of light reached. For this studies, simulations were performed with the refractive index of the base material of the optical filter 16 in transmission wavelength band being 3.3. The transmission wavelength band is 2 [μm] to 12 [μm].

As a software for the above-described simulation, "Zemax OpticStudio", Zemax was used. Table 4 illustrates the values of the amount of light reached when Lf is changed in a range of 0.8 [mm] to 1.8 [mm] and d is changed in a range of 1.31 [mm] to 4.81 [mm]. The amount of light reached is represented in arbitrary units. L0 (the length of the light emitter 11 in the longitudinal direction) is 0.6 [mm]. T (the thickness of the optical filter 16) is 530 [μm].

TABLE 4

| | | d (mm) | | | | | | | |
|---|---|---|---|---|---|---|---|---|---|
| | | 1.31 | 1.81 | 2.31 | 2.81 | 3.31 | 3.81 | 4.31 | 4.81 |
| Lf (mm) | 0.8 | 1.099 | 1.121 | 1.114 | 1.092 | 1.066 | 1.045 | 1.029 | 1.018 |
| | 0.9 | 1.110 | 1.099 | 1.065 | 1.037 | 1.020 | 1.012 | 1.009 | 1.006 |
| | 1.0 | 1.087 | 1.053 | 1.027 | 1.014 | 1.010 | 1.006 | 1.004 | 1.002 |
| | 1.1 | 1.052 | 1.025 | 1.013 | 1.008 | 1.005 | 1.003 | 1.001 | 1.001 |
| | 1.2 | 1.028 | 1.013 | 1.008 | 1.005 | 1.002 | 1.001 | 1.000 | 1.000 |
| | 1.3 | 1.015 | 1.009 | 1.005 | 1.002 | 1.001 | 1.000 | 1.000 | 1.000 |
| | 1.4 | 1.009 | 1.006 | 1.003 | 1.001 | 1.000 | 1.000 | 1.000 | 1.000 |

TABLE 4-continued

| | | d (mm) | | | | | | | |
|---|---|---|---|---|---|---|---|---|---|
| | | 1.31 | 1.81 | 2.31 | 2.81 | 3.31 | 3.81 | 4.31 | 4.81 |
| | 1.5 | 1.006 | 1.003 | 1.001 | 1.000 | 1.000 | 1.000 | 1.000 | 1.000 |
| | 1.6 | 1.003 | 1.002 | 1.000 | 1.000 | 1.000 | 1.000 | 1.000 | 1.000 |
| | 1.7 | 1.001 | 1.000 | 1.000 | 1.000 | 1.000 | 1.000 | 1.000 | 1.000 |
| | 1.8 | 1.000 | 1.000 | 1.000 | 1.000 | 1.000 | 1.000 | 1.000 | 1.000 |

Table 5 illustrates the calculated values of Lf×(√d) where Lf and d are same as in those of Table 4. From Tables 4 and 5, the value of Lf×(√d) can be set to be 2.5 or less to increase the amount of light reached. For the purpose of increasing the amount of light reached further, the value of Lf×(√d) is preferably 2.2 or less. A smaller Lf makes it easier for the light 18 emitted from the light emitter 11 to reach a side surface of the optical filter 16 directly. This may be because total reflection occurs on the side surfaces of the optical filter 16 and more light 18 travels through the interior of the optical filter 16 to a mirror of the light guide 17. If d becomes smaller, light 18 at a broader range of angles will reach the mirror of the light guide 17. Therefore, it is considered that the amount of light reached was increased by reducing Lf×(√d). The value of Lf×(√d) is preferably 0.9 or more because the limits of miniaturization of the optical filter 16 and the optical device, and constraints of mounting tolerance in processing. From Tables 4 and 5, d is preferably less than or equal to 6 times Lf.

TABLE 5

| | | d (mm) | | | | | | | |
|---|---|---|---|---|---|---|---|---|---|
| | | 1.31 | 1.81 | 2.31 | 2.81 | 3.31 | 3.81 | 4.31 | 4.81 |
| Lf (mm) | 0.8 | 0.916 | 1.076 | 1.216 | 1.341 | 1.455 | 1.562 | 1.661 | 1.755 |
| | 0.9 | 1.030 | 1.211 | 1.368 | 1.509 | 1.637 | 1.757 | 1.868 | 1.974 |
| | 1.0 | 1.145 | 1.345 | 1.520 | 1.676 | 1.819 | 1.952 | 2.076 | 2.193 |
| | 1.1 | 1.259 | 1.480 | 1.672 | 1.844 | 2.001 | 2.147 | 2.284 | 2.412 |
| | 1.2 | 1.373 | 1.614 | 1.824 | 2.012 | 2.183 | 2.342 | 2.491 | 2.632 |
| | 1.3 | 1.488 | 1.749 | 1.976 | 2.179 | 2.365 | 2.537 | 2.699 | 2.851 |
| | 1.4 | 1.602 | 1.884 | 2.128 | 2.347 | 2.547 | 2.733 | 2.906 | 3.070 |
| | 1.5 | 1.717 | 2.018 | 2.280 | 2.514 | 2.729 | 2.928 | 3.114 | 3.290 |
| | 1.6 | 1.831 | 2.153 | 2.432 | 2.682 | 2.911 | 3.123 | 3.322 | 3.509 |
| | 1.7 | 1.946 | 2.287 | 2.584 | 2.850 | 3.093 | 3.318 | 3.529 | 3.728 |
| | 1.8 | 2.060 | 2.422 | 2.736 | 3.017 | 3.275 | 3.513 | 3.737 | 3.948 |

Figure 13:
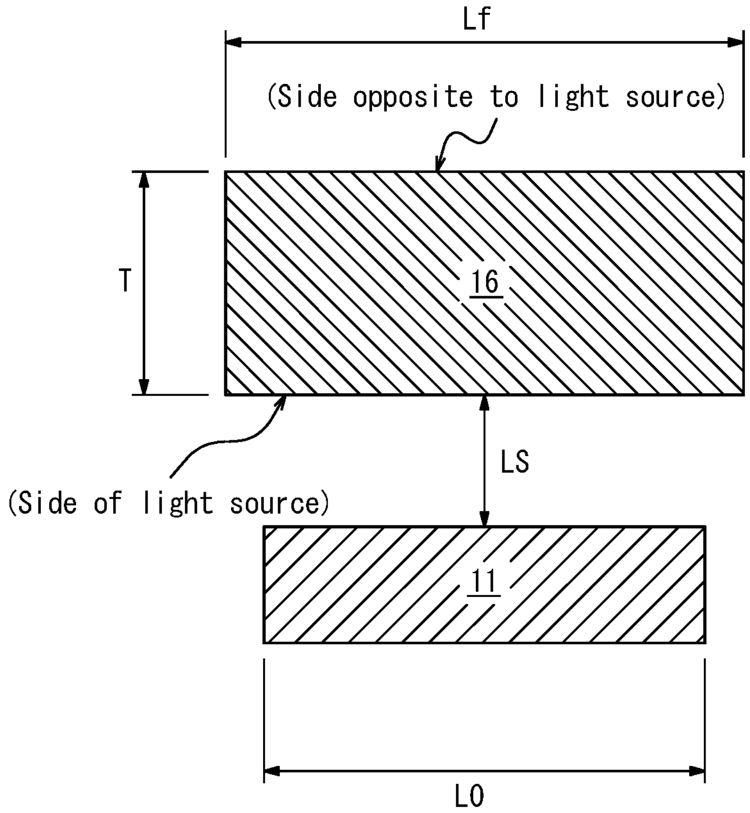
FIG. 13 illustrates an example of distance between the light source and the optical filter.

A distance between the incident plane for the light 18 of the optical filter 16 and the light emitter 11 (hereinafter, referred to as "distance between the light emitter 11 and the optical filter incident plane") is represented as LS in FIG. 13. The distance between the light emitter 11 and the optical filter incident plane is preferably 10 μm or more and is less than or equal to ½ of Lf [mm], which is the maximum length of the optical filter 16 in the longitudinal direction. The incident plane for the light 18 of the optical filter 16 is a surface on the side of the light source. The distance between the light emitter 11 and the optical filter incident plane is more preferably less than or equal to 1/10 of Lf [mm]. As the distance between the light emitter 11 and the optical filter incident plane becomes longer, light 18 that reaches the light guide 17 without passing through the optical filter 16 is increased. Therefore, desired wavelength selectivity cannot be achieved. The distance between the light emitter 11 and the optical filter incident plane is preferably 10 μm or more because the effect of interference increases as the distance becomes shorter.

As described above, a gas sensor 10 according to this embodiment is miniaturized and enable accurate measurement by employing the above-described configuration.

Although the embodiments of this disclosure have been described based on the drawings and Examples, it should be noted that various variations or modifications can be easily made by a person skilled in the art based on this disclosure. Thus, it should be noted that these variations or modifications fall within the range of this disclosure. For example, although the gas sensor 10 has been described in the above-described embodiments, an optical device composed of the light emitter 11 and the optical filter 16, which are portions of the gas sensor 10, enables miniaturized accurate gas measurement. Therefore, it should be noted that such an optical device falls within the range of this disclosure.

The invention claimed is:

1. A gas sensor, the gas sensor comprising:
a light emitter that emits light as infrared light;
a detector that detects a signal based on light emitted from the light emitter;
a light guide that at least includes a mirror and reflects the light to form an optical path in which the light emitted from the light emitter passes through an introduced gas; and
an optical filter that is disposed in the optical path to limit a transmission wavelength band of the light, wherein
a base material of the optical filter has a refractive index of 1.5 or more in the transmission wavelength band, and
the optical filter satisfies $0.3<(T/Lf)<1.3$ where T [mm] is a thickness of the optical filter and Lf [mm] is a maximum length of the optical filter in a longitudinal direction in a planar view, wherein
the optical filter is positioned to satisfy $0.9<(Lf\times(\sqrt{d})\leq 2.5$ where d [mm] is the shortest distance between a surface of the optical filter on a side opposite to the light emitter and the mirror of the light guide which the light first reaches.

2. A gas sensor, the gas sensor comprising:
a light emitter that emits light as infrared light;
a detector that detects a signal based on light emitted from the light emitter;
a light guide that at least includes a mirror and reflects the light to form an optical path in which the light emitted from the light emitter passes through an introduced gas; and
an optical filter that is disposed in the optical path to limit a transmission wavelength band of the light; wherein
a base material of the optical filter has a refractive index of 1.5 or more in the transmission wavelength band,
a ratio of an area of the optical filter in a planar view to an area of the light emitter is in a range of 1 to 1.2, and
the optical filter satisfies $0.25<(T/Lf)\leq 0.3$ where T [mm] is a thickness of the optical filter and Lf [mm] is a maximum length of the optical filter in a longitudinal direction in the planar view, wherein the optical filter is positioned to satisfy $0.9\leq(Lf\times(\sqrt{d}))\leq 2.5$ where d [mm] is the shortest distance between a surface of the optical filter on a side opposite to the light emitter and the mirror of the light guide which the light first reaches.

3. The gas sensor according to claim 1, wherein
the light emitter is an LED.

4. The gas sensor according to claim 1, wherein
the detector is a microphone and, by using a photoacoustic method, determines the presence or a concentration of a gas to be detected.

5. The gas sensor according to claim 1, wherein
an area of the surface of the optical filter on the side opposite to the light emitter is larger than an area of a surface of the optical filter on a side of the light source.

6. The gas sensor according to claim 1, wherein
the optical filter has a maximum length in a longitudinal direction at an intermediate portion between a surface on a side of the light emitter and the surface on the side opposite to the light emitter.

7. The gas sensor according to claim 1, wherein
the refractive index is 3.2 or more.

8. The gas sensor according to claim 1, wherein
the optical filter is positioned in such a way that a distance between a surface on a side of the light emitter and the light emitter is 10 μm or more and is less than or equal to ½ of Lf [mm].

9. The gas sensor according to claim 8, wherein
the optical filter is positioned in such a way that the distance between the surface on the side of the light emitter and the light emitter is 10 μm or more and less than or equal to 1/10 of Lf [mm].

10. The gas sensor according to claim 1, wherein
the d is less than or equal to 6 times the Lf.

11. The gas sensor according to claim 1, wherein
a ratio of an area of the optical filter in the planar view to an area of the light emitter is in a range of 1 to 1.2.

12. The gas sensor according to claim 1, wherein
a portion of a side surface of the optical filter is exposed and other portions of the side surface are covered.

13. The gas sensor according to claim 1, wherein
an edge of the optical filter is not provided with a screen and the entire surface of the optical filter is exposed.

14. An optical device, the optical device comprising:
a light emitter that emits light as infrared light;
a light guide that at least includes a mirror and reflects the light to form an optical path in which the light emitted from the light emitter passes through an introduced gas; and
an optical filter that is disposed in an optical path to limit a transmission wavelength band of the light, wherein
a base material of the optical filter has a refractive index of 1.5 or more in the transmission wavelength band, and
the optical filter satisfies $0.3<(T/Lf)<1.3$ where T [mm] is a thickness of the optical filter and Lf [mm] is a maximum length of the optical filter in a longitudinal direction in a planar view, wherein
the optical filter is positioned to satisfy $0.9<(Lf\times(\sqrt{d})\leq 2.5$ where d [mm] is the shortest distance between a surface of the optical filter on a side opposite to the light emitter and the mirror of the light guide which the light first reaches.

* * * * *